(12) United States Patent
Li et al.

(10) Patent No.: US 11,490,168 B2
(45) Date of Patent: Nov. 1, 2022

(54) METHOD AND APPARATUS FOR SELECTING VIDEO CLIP, SERVER AND MEDIUM

(71) Applicant: BEIJING BAIDU NETCOM SCIENCE AND TECHNOLOGY CO., LTD., Beijing (CN)

(72) Inventors: Fu Li, Beijing (CN); Dongliang He, Beijing (CN); Hao Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 117 days.

(21) Appl. No.: 17/026,488

(22) Filed: Sep. 21, 2020

(65) Prior Publication Data
US 2021/0227302 A1    Jul. 22, 2021

(30) Foreign Application Priority Data

Jan. 20, 2020  (CN) .......................... 202010065171.8

(51) Int. Cl.
| | | |
|---|---|---|
| *H04N 21/234* | (2011.01) | |
| *H04N 21/439* | (2011.01) | |
| *H04N 21/44* | (2011.01) | |
| *H04N 21/466* | (2011.01) | |
| *H04N 21/81* | (2011.01) | |
| *H04N 21/658* | (2011.01) | |
| *H04N 21/8549* | (2011.01) | |

(52) U.S. Cl.
CPC ..... *H04N 21/812* (2013.01); *H04N 21/23424* (2013.01); *H04N 21/6582* (2013.01); *H04N 21/8549* (2013.01)

(58) Field of Classification Search
None
See application file for complete search history.

(56) References Cited

U.S. PATENT DOCUMENTS

| | | | |
|---|---|---|---|
| 2015/0312652 A1 | 10/2015 | Baker et al. | |
| 2016/0014482 A1* | 1/2016 | Chen | H04N 21/8456 386/241 |
| 2019/0289372 A1* | 9/2019 | Merler | H04N 21/44 |

FOREIGN PATENT DOCUMENTS

| | | | |
|---|---|---|---|
| CN | 101431689 A | 5/2009 | |
| CN | 106792218 A | 5/2017 | |
| CN | 107832724 A | 3/2018 | |
| CN | 108429920 A | 8/2018 | |
| CN | 109618184 A | 4/2019 | |

(Continued)

*Primary Examiner* — Brian T Pendleton
*Assistant Examiner* — Jean D Saint Cyr
(74) *Attorney, Agent, or Firm* — Lathrop GPM LLP (57) ABSTRACT

Embodiments of the present disclosure relate to a method and apparatus for selecting a video clip, a server and a medium. The method may include: determining at least two video clips from a video; for each video clip, perform following excitement determination steps: inputting a feature sequence of a video frame in the video clip and title information of the video into a pre-established prediction model to obtain a relevance between the inputted video frame and a title of the video; and determining an excitement of the video clip, based on the relevance between the video frame in the video clip and the title; and determining a target video clip from the video clips, based on the excitement of each of the video clips.

15 Claims, 6 Drawing Sheets

(56) References Cited

FOREIGN PATENT DOCUMENTS

| | | | |
|---|---|---|---|
| CN | 109889923 | A | 6/2019 |
| CN | 110072140 | A | 7/2019 |
| CN | 110267119 | A | 9/2019 |
| CN | 110347872 | A | 10/2019 |
| CN | 110598014 | A | 12/2019 |
| JP | 2013098997 | A | 5/2013 |
| WO | WO 2010057085 | A1 | 5/2010 |

* cited by examiner

METHOD AND APPARATUS FOR SELECTING VIDEO CLIP, SERVER AND MEDIUM

CROSS-REFERENCE TO RELATED APPLICATIONS

This application claims priority to Chinese Application No. 202010065171.8, filed on Jan. 20, 2020 and entitled "Method and Apparatus for Selecting Video Clip, Server and Medium," the entire disclosure of which is hereby incorporated by reference.

TECHNICAL FIELD

Embodiments of the present disclosure relate to the field of computer technology, and specifically to a method and apparatus for selecting a video clip, a server and a medium.

BACKGROUND

The most exciting, eye-catching or the most title-fitting clip in a video is called the exciting clip of the video. Selecting the exciting clip from the video has a very wide range of applications. For example, extracting the most exciting or most related clip, may be used for a dynamic cover of video display to attract users to click, may be used for quick review by a tagger who just needs to view the most important clip without viewing the entire video, may be used for subsequent and further advanced processing of the video, such as adding special effects, slow-motion and other operations, and may also be used for an exciting shot collection, related video recommendation, and the like.

In the related art, there are two methods for selecting an exciting clip in a video: the first method is manual selection. After viewing an entire video, the tagger manually selects the most exciting clip and outputs it as the exciting clip. The second method is full-supervised model training. For each training video, an operator needs to mark the start and end positions of each exciting clip, and then uses deep learning to train a binary classification model to determine which clip is exciting and which clip is not exciting.

Due to growing video resources today, reviewers of the two methods face up to 100,000 or even millions of newly released videos every day, resulting in manpower shortage and a backlog of resources; and at the same time, a lot of repetitive work adds a lot of unnecessary costs.

SUMMARY

Embodiments of the present disclosure propose a method and apparatus for selecting a video clip.

In a first aspect, an embodiment of the present disclosure provides a method for selecting a video clip, the method including: determining at least two video clips from a video; for each video clip, performing following excitement determination steps: inputting a feature sequence of a video frame in the video clip and title information of the video into a pre-established prediction model to obtain a relevance between the inputted video frame and a title of the video, and determining an excitement of the video clip, based on the relevance between the video frame in the video clip and the title; and determining a target video clip from the video clips, based on the excitement of each of the video clips.

In some embodiments, the inputting a feature sequence of a video frame in the video clip and title information of the video into a pre-established prediction model to obtain a relevance between the inputted video frame and a title of the video, comprises: inputting the feature sequence into a first fully connected network module, and outputting a dimension-reduced feature sequence; inputting the dimension-reduced feature sequence into a forward GRU module and a reverse GRU module respectively, and splicing outputs of the forward GRU module and the reverse GRU module to obtain an encoded feature sequence; and inputting the encoded feature sequence and the title information of the video into an attention module to obtain the relevance between the video frame and the title, the attention module comprising a second fully connected network module and a Softmax processing module, an output dimension of the second fully connected network module being 1.

In some embodiments, an output dimension of the first fully connected network module is smaller than a dimension of the feature sequence of the video frame, so that a dimension of the feature sequence outputted by the first fully connected network module is smaller than the dimension of the feature sequence of the video frame; and hidden dimensions of the forward GRU module and the reverse GRU module are both half of the output dimension of the first fully connected network module, so that a dimension of the encoded feature sequence formed after splicing the outputs of the forward GRU module and the reverse GRU module is the same as the dimension of the feature sequence outputted by the first fully connected network module.

In some embodiments, the prediction model is obtained by training as follows: acquiring a training video; acquiring a feature sequence of a video frame in the training video, title information of the training video, and a relevance between the video frame in the training video and the title information of the training video, based on the acquired video; and using the acquired feature sequence of the video frame in the training video and the title information of the training video as inputs, and using the relevance between the video frame in the training video and the title information of the training video as an expected output, training a pre-established initial prediction model to obtain the prediction model after training.

In some embodiments, the title information is acquired as follows: performing word segmentation on the title of the video; determining a position index of a word included in the title of the video in a dictionary, the dictionary being a set of pre-stored words; and determining the position index as the title information of the video.

In some embodiments, the video frame is a set of specific frame images selected from all frame images included in the video clip based on a preset condition.

In a second aspect, an embodiment of the present disclosure provides an apparatus for selecting a video clip, the apparatus including: a segmentation unit, configured to determine at least two video clips from a video; an excitement calculation unit, configured to, for each video clip, perform following excitement determination steps: inputting a feature sequence of a video frame in the video clip and title information of the video into a pre-established prediction model to obtain a relevance between the inputted video frame and a title of the video; and determining an excitement of the video clip, based on the relevance between the video frame in the video clip and the title; and a selection unit, configured to determine a target video clip from the video clips, based on the excitement of each of the video clips.

In some embodiments, the excitement calculation unit comprises a video frame relevance calculation module, configured to perform following steps: inputting the feature sequence into a first fully connected network module, and outputting a dimension-reduced feature sequence; inputting the dimension-reduced feature sequence into a forward GRU module and a reverse GRU module respectively, and splicing outputs of the forward GRU module and the reverse GRU module to obtain an encoded feature sequence; and inputting the encoded feature sequence and the title information of the video into an attention module to obtain the relevance between the video frame and the title, the attention module comprising a second fully connected network module and a Softmax processing module, an output dimension of the second fully connected network module being 1.

In some embodiments, the video frame relevance calculation module is further configured to: an output dimension of the first fully connected network module is smaller than a dimension of the feature sequence of the video frame, so that a dimension of the feature sequence outputted by the first fully connected network module is smaller than the dimension of the feature sequence of the video frame; and hidden dimensions of the forward GRU module and the reverse GRU module are both half of the output dimension of the first fully connected network module, so that a dimension of the encoded feature sequence formed after splicing the outputs of the forward GRU module and the reverse GRU module is the same as the dimension of the feature sequence outputted by the first fully connected network module.

In some embodiments, the apparatus further comprises a model training unit, configured to obtain the prediction model by training as follows: acquiring a training video; acquiring a feature sequence of a video frame in the training video, title information of the training video, and a relevance between the video frame in the training video and the title information of the training video, based on the acquired video; and using the acquired feature sequence of the video frame in the training video and the title information of the training video as inputs, and using the relevance between the video frame in the training video and the title information of the training video as an expected output, training a pre-established initial prediction model to obtain the prediction model after training.

In some embodiments, the apparatus further comprises a title information acquisition unit, configured to perform following steps: performing word segmentation on the title of the video; determining a position index of a word included in the title of the video in a dictionary, the dictionary being a set of pre-stored words; and determining the position index as the title information of the video.

In some embodiments, the apparatus further comprises a video frame extraction unit, configured to select the video frame from the video clip based on a preset condition.

According to the method and apparatus for selecting a video clip provided by embodiments of the present disclosure, by calculating the relevance between the video frame and the title using the prediction model to represent the excitement of the video frame, then obtaining the excitement of each clip in the video, and determining a clip having the highest excitement as the most exciting clip in the video, the workload of an operator may be greatly reduced and the efficiency of video selection may be improved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
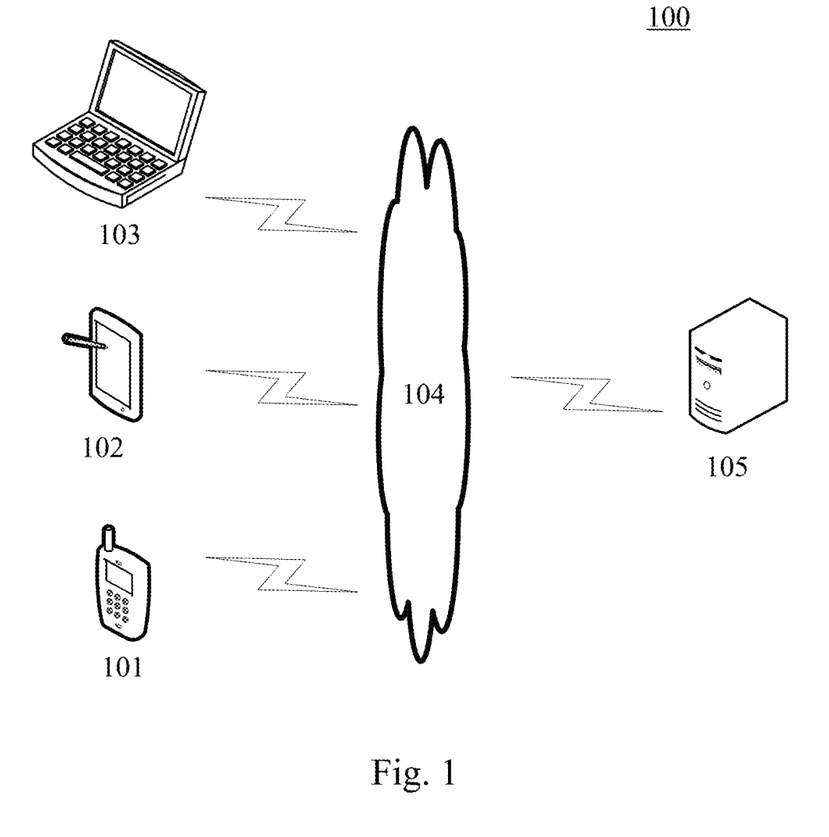
FIG. 1 is a diagram of an example system architecture in which some embodiments of the present disclosure may be implemented.

FIG. 1 illustrates an example system architecture 100 in which a method for selecting a video clip or an apparatus for selecting a video clip according to embodiments of the present disclosure may be implemented.

As shown in FIG. 1, the system architecture 100 may include terminal devices 101, 102, 103, a network 104 and a server 105. The network 104 serves as a medium providing a communication link between the terminal devices 101, 102, 103 and the server 105. The network 104 may include various types of connections, such as wired or wireless communication links, or optic fibers.

A user may use the terminal devices 101, 102, and 103 to interact with the server 105 through the network 104 to send a video of clips to be selected to the server or receive a clip selected by the server. Information interaction applications may be installed on the terminal devices 101, 102, and 103.

The terminal devices 101, 102, and 103 may be hardware or software. When the terminal devices 101, 102, and 103 are hardware, the terminal devices 101, 102, and 103 may be various electronic devices having a display screen and support information interaction, including but not limited to smart phones, tablet computers, e-book readers, laptop portable computers, desktop computers and the like. When the terminal devices 101, 102, and 103 are software, the terminal devices 101, 102, and 103 may be installed in the electronic devices listed above. They may be implemented, for example, as a plurality of software programs or software modules for providing distributed services, or as a single software program or software module. The present disclosure is not specifically limited herein.

The server 105 may be a server that provides various services, such as a backend data processing server that processes videos uploaded by the terminal devices 101, 102, and 103. The backend data processing server may process received videos and select exciting clips from the videos, and feed back processing results (such as exciting clips) to the terminal devices.

It should be noted that the method for selecting a video clip provided by embodiments of the present disclosure may be performed by the server 105. Accordingly, the apparatus for selecting a video clip may be provided in the server 105.

It should be noted that the server may be hardware or software. When the server is hardware, the server may be implemented as a distributed server cluster composed of a plurality of servers, or as a single server. When the server is software, the server may be implemented, for example, as a plurality of software programs or software modules for providing distributed services, or as a single software program or software module. The present disclosure is not specifically limited herein.

Figure 2:
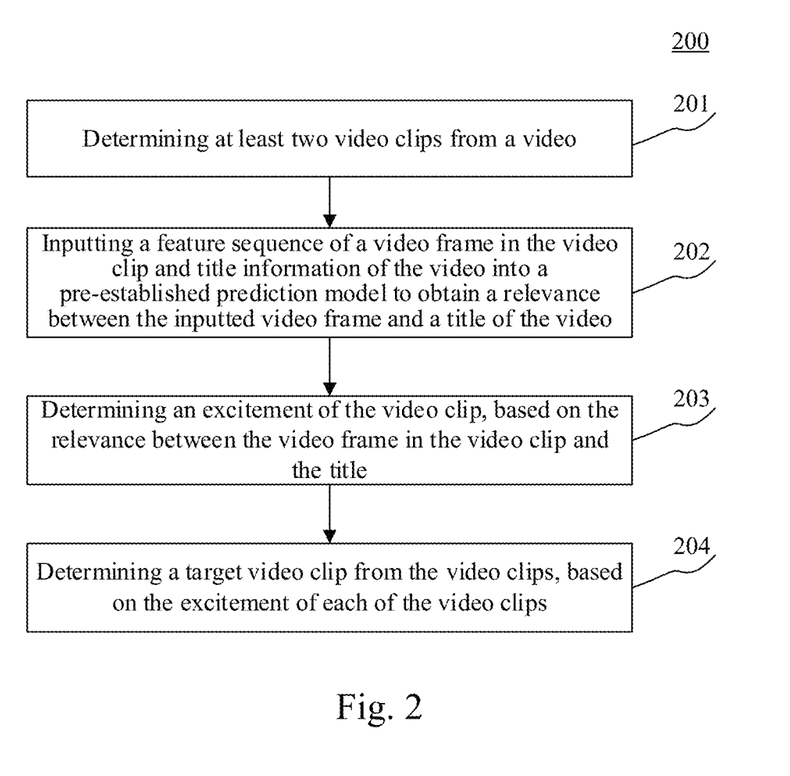
FIG. 2 is a flowchart of a method for selecting a video clip according to an embodiment of the present disclosure.

With further reference to FIG. 2, a flow 200 of a method for selecting a video clip according to an embodiment of the present disclosure is illustrated. The method for selecting a video clip includes the following steps.

Step 201, determining at least two video clips from a video.

In the present embodiment, an executing body (for example, the server shown in FIG. 1) of the method for selecting a video clip may receive a video of clips to be selected from a terminal with which a user performs information interaction through a wired connection or a wireless connection. It should be noted that the wireless connection may include but is not limited to 3G/4G connection, WiFi connection, Bluetooth connection, WiMAX connection, Zigbee connection, UWB (ultra wideband) connection, and other wireless connection methods that are now known or to be developed in the future.

Typically, the user uses an information interaction function on the terminal to send the video of clips to be selected to the executing body. In the present embodiment, the video of clips to be selected may include video of WMA format, AVI format, MP4 format, ASF format, MPEG format, MOV format, RM format, and FLV format. After receiving the video of clips to be selected, the executing body divides the video into at least two non-overlapping clips, then separately calculates the excitements of the two clips, and selects the clip having the highest excitement from the two clips to be the most exciting clip in the entire video. In this way, it may be ensured that the selected exciting clip is continuous and may not affect viewing experience. The following steps are performed to calculate the excitement respectively for the at least two clips. For example, the video may be divided into a plurality of non-overlapping clips based on the video content, or may be divided based on time, and the specific implementation is not limited herein.

Step 202, inputting a feature sequence of a video frame in the video clip and title information of the video into a pre-established prediction model to obtain a relevance between the inputted video frame and a title of the video.

In the present embodiment, based on the video clip obtained in step 201, the executing body (for example, the server shown in FIG. 1) inputs the feature sequence of the video frame included in the video clip and the title of the video into the pre-established prediction model, and outputs the relevance between the video frame and the title of the video. The relevance in the present embodiment is used to represent a degree of coincidence between the video frame and the title of the video. The higher the degree of coincidence, the higher the excitement of the video frame.

In the present embodiment, the word vector of a keyword in the title of the video may be used as the title information, and the word vector is used to point to the position of the keyword in a pre-stored word set.

In the present embodiment, the extraction of the feature sequence of the video frame may be achieved by the existing technology. For example, an open source network structure ResNet101 may be used to directly extract features of the video frame, and an output of a pooling layer before a classifier may be selected as the feature sequence of the video frame. For example, if the video clip includes N video frames and an output dimension of the pooling layer is 2048, then the feature sequence of the video frame is a sequence of N×2048.

In the present embodiment, the main task of the prediction model is to analyze and understand the video content, and automatically name a general title for the video. In the process of naming the title, the contribution of each video frame is different. By learning a generalization degree of each video frame to the title, the relevance between each video frame and the title is indirectly obtained to measure the excitement of the video frame.

Step 203, determining an excitement of the video clip, based on the relevance between the video frame in the video clip and the title.

In some alternative implementations, an average value of the relevance between a plurality of video frames selected from the video clip and the title may be used as the excitement of the video clip to measure the excitement of the video clip.

By performing the above steps 202 and 203 on each video clip included in the video respectively, the excitement of each video clip may be determined.

Further, the present embodiment further includes the following step.

Step 204, determining a target video clip from the video clips, based on the excitement of each of the video clips. In the present embodiment, for example, the video clip having the highest excitement may be determined as the target video clip to be selected, so as to realize the selection of the exciting clip in the entire video.

Figure 3:
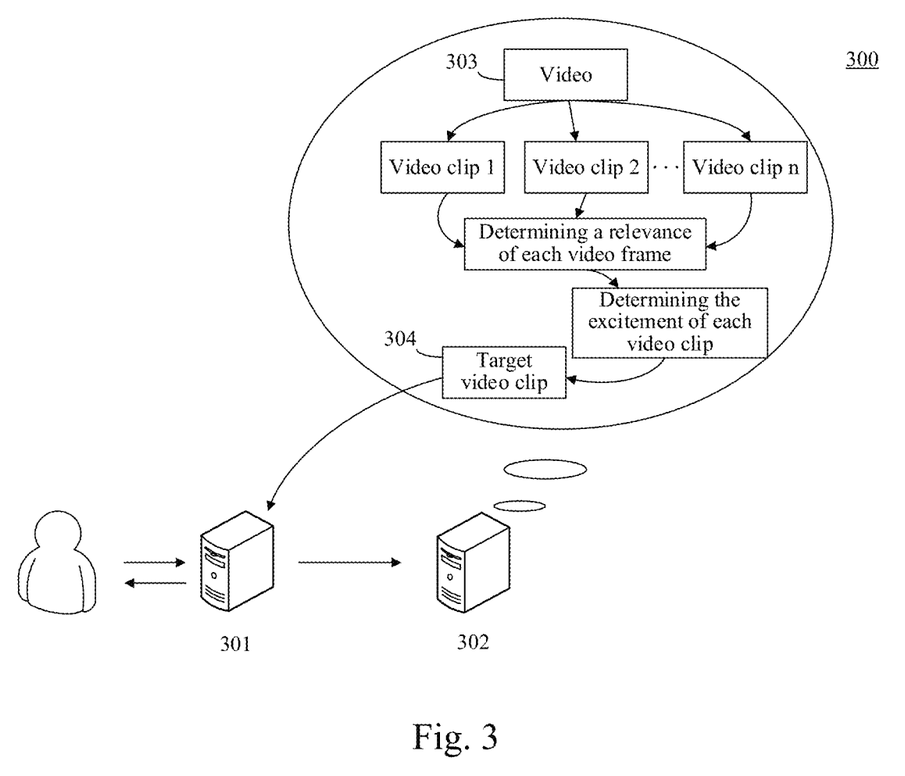
FIG. 3 is a schematic diagram of an application scenario of the method for selecting a video clip according to an embodiment of the present disclosure.

With further reference to FIG. 3, FIG. 3 is a schematic diagram 300 of an application scenario of the method for selecting a video clip according to the present embodiment. In the application scenario of FIG. 3, the user sends a video 303 of clips to be selected to a server 302 using a terminal device 301, and the server 302, as an executing body in the application scenario, performs the following operations on the video 303: determining at least two video clips from the video 303, for example, dividing the video into a plurality of non-overlapping video clips based on duration, then performing steps for calculating an excitement of each video clip, extracting a feature sequence of a title of the video and a feature sequence of a video frame in each video clip, inputting the feature sequences into a prediction model to determine a relevance of the video frame included in the clip, and determining the excitement of each video clip based on the relevance of the video frame, and then based on the excitement of each video clip, determining a video clip having the highest excitement as a selected target video clip 304, completing the selection process of the exciting clip in the video. Finally, the server 302 sends the determined target video clip to the terminal 301 as the exciting clip in the video 303, and the terminal 301 presents it to the user.

According to the method in the above embodiment provided by the present disclosure, by determining the relevance between the video frame and the title of the video using the prediction model to represent the excitement of the video frame, then obtaining the excitement of each clip in the video, and determining a clip having the highest excitement as the most exciting clip in the video, the workload of an operator may be greatly reduced and the efficiency of video selection may be improved.

Figure 4:
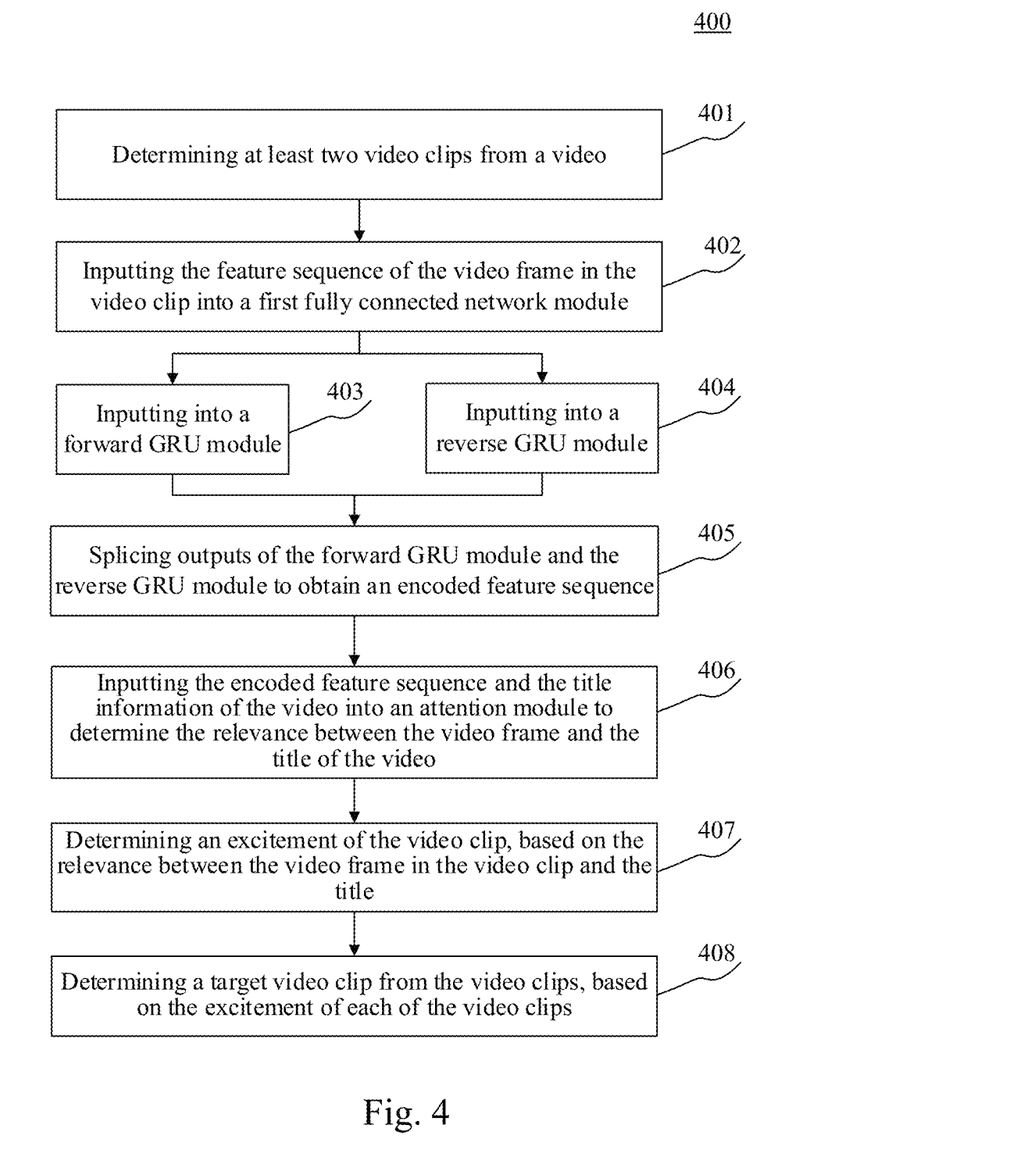
FIG. 4 is a flowchart of the method for selecting a video clip according to another embodiment of the present disclosure.

With further reference to FIG. 4, a flow 400 of the method for selectin another embodiment of g a video clip is illustrated. The flow 400 of the method for selecting a video clip includes the following steps.

Step 401, determining at least two video clips from a video. This step is similar to the aforementioned step 201 and detailed description thereof will be omitted.

Step 402, inputting the feature sequence of the video frame in the video clip into a first fully connected network module. With regard to the method for acquiring the feature sequence of the video frame, please refer to the related content in the foregoing step 202.

In some alternative implementations, an output dimension of the first fully connected network module is smaller than a dimension of the feature sequence. Through step 402, the dimension of the feature sequence may be reduced, thereby playing a role in saving computational effort. For example, based on the feature sequence of N×2048 obtained above, the output dimension of the first fully connected network module may be set to 1024, then after inputting the feature sequence into the first fully connected network module, a feature sequence of N×1024 is outputted. As another example, the output dimension of the first fully connected network module may be set to 512, and then a feature sequence of N×512 is outputted.

Step 403, inputting the feature sequence outputted in step 402 into a forward GRU (gated recurrent unit) module.

Step 404, inputting the feature sequence outputted in step 402 into a reverse GRU module.

Step 403 and step 404 are actually inputting the feature sequence outputted in step 402 into the forward GRU module and the reverse GRU module respectively, and the function of the step 403 and step 404 is to associate the feature sequence of the frame image with time. Through two-way operation (forward GRU and reverse GRU), timing information of the model may be better established. Since the two GRU modules are not connected to each other, the outputs of the two modules are spliced together to obtain an encoded feature sequence, that is, step 405 is performed.

Step 405, splicing outputs of the forward GRU module and the reverse GRU module to obtain an encoded feature sequence.

In some alternative implementations, in order not to increase additional calculation so that the dimension of the encoded feature sequence is consistent with the dimension of the feature sequence before inputting, output dimensions of the forward GRU module and the reverse GRU module may be both set to half of the output dimension of the first fully connected network module. The following illustrates with reference to the previous example, if the feature sequence of the extracted video frame is N×2048, the output dimension of the first fully connected network module is 1024, then the feature sequence inputted into the forward GRU module and the reverse GRU module is N×1024, hidden dimensions of the two GRU modules may be set to 512, then the output dimensions of the two GRU modules are both 512, and the encoded feature sequence obtained on this basis is N×1024.

Step 406, inputting the encoded feature sequence and the title information of the video into an attention module to determine the relevance between the video frame and the title of the video.

The function of the attention module is to learn the weight of each video frame, and the weight is the relevance between the corresponding video frame and the title. In the present embodiment, the step 406 is implemented through the following steps.

Inputting the encoded feature sequence and the title information into a second fully connected network module to obtain a degree of coincidence between the encoded feature sequence and the title of the video. An output dimension of the second fully connected network module is 1, and the output is a feature sequence of N×1, then the output feature sequence of N×1 is subjected to Softmax processing, so that the sum of the values in the feature sequence is 1, and a weight value sequence of N×1 may be obtained. N weight values in the sequence correspond to the relevance of N video frames and the title of the video.

Step 407, determining an excitement of the video clip, based on the relevance between the video frame in the video clip and the title. This step is similar to the aforementioned step 203 and detailed description thereof will be omitted.

The above steps 402 to 407 will be performed on all the clips determined from the video to obtain the excitement of each clip.

Step 408, determining a target video clip from the video clips, based on the excitement of each of the video clips. This step is similar to the aforementioned step 204 and detailed description thereof will be omitted.

As can be seen from FIG. 4, compared to the embodiment corresponding to FIG. 2, the flow 400 of the method for selecting a video clip in the present embodiment embodies the detailed steps of determining the relevance of the video frame using the prediction model. Therefore, the solution described in the present embodiment may be used to determine exciting clips in the video through weak supervision, thereby saving the workload of an operator.

In some alternative implementations of the present embodiment, the prediction model may be obtained by training as follows.

Acquiring a training video. The executing body of the present embodiment may acquire a training sample through a plurality of channels, such as acquiring a video through the network.

Acquiring a feature sequence of a video frame in the training video, title information of the training video, and a relevance between the video frame and the title information, based on the acquired video. For this step, please refer to the aforementioned steps 401 to 406.

Using the acquired feature sequence of the video frame and the title information of the training video as inputs, and using the relevance between the video frame and the title information as an expected output, training a pre-established initial prediction model to obtain the prediction model after training. The following illustrates using an example. An encoded feature vector may be obtained by multiplying and summing the encoded feature sequence and a corresponding value in the weight value sequence. Then, the encoded feature vector is inputted into the GRU module. At each time of the GRU module, there are three inputs, which are the encoded feature sequence, the encoded feature vector, and the true value of the previous time, and the function of the GRU module is to predict the next value, that is, output a predicted value. A loss value at the time may be calculated based on the true value and the predicted value at each time, and the sum of the loss values at all times is the total loss value during the training. Through training, the prediction model may be obtained by reducing the total loss value of the initial prediction model to a specific level.

As an alternative implementation, the title information in the foregoing embodiments may be obtained as follows: performing word segmentation on the title of the video; determining a position index of a word included in the title of the video in a dictionary, the dictionary being a set of pre-stored words; and determining the position index as the title information of the video. For example, a word segmentation tool in related arts may be used to perform word segmentation on the title. For example, the title of a video of clips to be selected is: "The electric welder displays superb welding craft on site, upon viewing the final finished product, I just thumb-up", and a word segmentation result is: "electric, welder, on site, display, superb, welding, craft, view, final, of, finished product, I, just, thumb-up", and then the frequency of occurrence of each word is counted, words of lower frequency are deleted, and each remaining word is mapped to the position index in the dictionary to form the feature sequence of the title of the video. The dictionary is a set of all the words pre-stored in the prediction model.

It should be noted that, as an alternative implementation, the video frame in the foregoing embodiments may be a set of specific frame images selected from the video clip based on a preset condition, for example, the selection may be based on time, one of the frame images is selected from the plurality of frame images included in each second of the video clip, and the set of these frame images is the video frame of the video clip.

Figure 5:
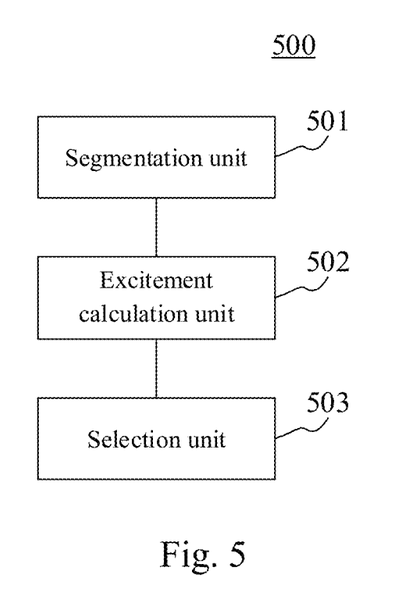
FIG. 5 is a schematic structural diagram of an apparatus for selecting a video clip according to an embodiment of the present disclosure.

With further reference to FIG. 5, as an implementation of the method shown in the above figures, an embodiment of the present disclosure provides an apparatus for selecting a video clip, and the apparatus embodiment may correspond to the method embodiment as shown in FIG. 2, and the apparatus may be specifically applied to various electronic devices.

As shown in FIG. 5, an apparatus 500 for selecting a video clip of the present embodiment includes: a segmentation unit 501, an excitement calculation unit 502 and a selection unit 503. The segmentation unit 501 is configured to determine at least two video clips from a video. The excitement calculation unit 502 is configured to, for each video clip, perform following excitement determination steps: inputting a feature sequence of a video frame in the video clip and title information of the video into a pre-established prediction model to obtain a relevance between the inputted video frame and a title of the video; and determining an excitement of the video clip, based on the relevance between the video frame in the video clip and the title. The selection unit 503 is configured to determine a target video clip from the video clips, based on the excitement of each of the video clips.

In the present embodiment, the excitement calculation unit 502 includes a video frame relevance calculation module, configured to perform following steps: inputting the feature sequence into a first fully connected network module, and outputting a dimension-reduced feature sequence; inputting the dimension-reduced feature sequence into a forward GRU module and a reverse GRU module respectively, and splicing outputs of the forward GRU module and the reverse GRU module to obtain an encoded feature sequence; and inputting the encoded feature sequence and the title information of the video into an attention module to obtain the relevance between the video frame and the title, the attention module including a second fully connected network module and a Softmax processing module, an output dimension of the second fully connected network module being 1.

In the present embodiment, the video frame relevance calculation module is further configured to: an output dimension of the first fully connected network module is smaller than a dimension of the feature sequence of the video frame, so that a dimension of the feature sequence outputted by the first fully connected network module is smaller than the dimension of the feature sequence of the video frame; and hidden dimensions of the forward GRU module and the reverse GRU module are both half of the output dimension of the first fully connected network module, so that a dimension of the encoded feature sequence formed after splicing the outputs of the forward GRU module and the reverse GRU module is the same as the dimension of the feature sequence outputted by the first fully connected network module.

In the present embodiment, the apparatus further includes a model training unit, configured to obtain the prediction model by training as follows: acquiring a training video; acquiring a feature sequence of a video frame in the training video, title information of the training video, and a relevance between the video frame in the training video and the title information of the training video, based on the acquired video; and using the acquired feature sequence of the video frame in the training video and the title information of the training video as inputs, and using the relevance between the video frame in the training video and the title information of the training video as an expected output, training a pre-established initial prediction model to obtain the prediction model after training.

In the present embedment, in some embodiments, the apparatus further includes a title information acquisition unit, configured to perform following steps: performing word segmentation on the title of the video; determining a position index of a word included in the title of the video in a dictionary, the dictionary being a set of pre-stored words; and determining the position index as the title information of the video.

In the present embodiment, the apparatus further includes a video frame extraction unit, configured to select the video frame from the video clip based on a preset condition.

Figure 6:
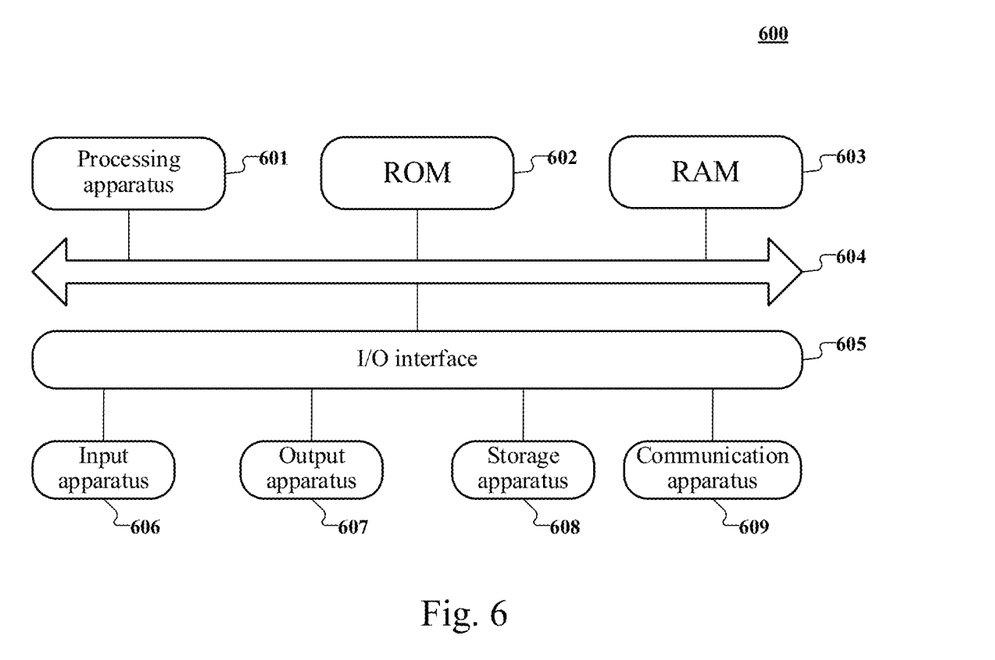
FIG. 6 is a schematic structural diagram of an electronic device suitable for implementing embodiments of the present disclosure.

With reference to FIG. 6, a schematic structural diagram of an electronic device (for example, the server or terminal devices shown in FIG. 1) 600 adapted to implement embodiments of the present disclosure is illustrated. The terminal devices in embodiments of the present disclosure may include, but are not limited to, mobile terminals such as mobile phones, notebook computers, digital broadcast receivers, PDAs (personal digital assistants), PADs (tablet computers), PMPs (portable multimedia players), or in-vehicle terminals (for example, in-vehicle navigation terminals) and fixed terminals such as digital TVs, desktop computers. The terminal device/server shown in FIG. 6 is only an example, and should not bring any limitation to the functions and use scope of embodiments of the present disclosure.

As shown in FIG. 6, the electronic device 600 may include a processing apparatus (for example, a central processor, a graphics processor, etc.) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatuses may be connected to the I/O interface 605: an input apparatus 606, including such as a touch screen, a touch pad, a keyboard, a mouse, a camera, a microphone, an accelerometer, or a gyroscope; an output apparatus 607 including such as a liquid crystal display (LCD), a speaker, or a vibrator; the storage apparatus 608 including such as a magnetic tape, or a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all the apparatuses shown. More or fewer apparatuses may be implemented or provided instead. Each block shown in FIG. 6 may represent one apparatus, and may also represent a plurality of apparatuses as required.

In particular, according to embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for performing the method as illustrated in the flow chart. In such an embodiment, the computer program may be downloaded and installed from a network using the communication apparatus 609, or installed from the storage apparatus 608, or installed from the ROM 602. The computer program, when executed by the processing apparatus 601, implements the above mentioned functionalities as defined by the method of embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the above server, or a stand-alone computer readable medium not assembled into the electronic device. The computer readable medium carries one or more programs. The one or more programs, when executed by the electronic device, cause the electronic device to: determine at least two video clips from a video; for each video clip, perform following excitement determination steps: inputting a feature sequence of a video frame in the video clip and title information of the video into a pre-established prediction model to obtain a relevance between the inputted video frame and a title of the video, the title information of the video being a position index of a phrase in a dictionary included after word segmentation on the title of the video, and the dictionary is a set of phrases obtained by performing word segmentation on titles of all training samples; and determining an excitement of the video clip, based on the relevance between the video frame in the video clip and the title; and determining a target video clip from the video clips, based on the excitement of each of the video clips.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by means of software or hardware.

The described units may also be provided in a processor, for example, may be described as: a processor including a segmentation unit, an excitement calculation unit and a selection unit. Here, the names of these units do not in some cases constitute limitations to such units themselves. For example, the segmentation unit may also be described as "a unit configured to determine at least two video clips from a video."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for selecting a video clip, the method comprising:
    determining at least two video clips from a video;
    for each video clip, performing following excitement determination steps:
    inputting a feature sequence of a video frame in the video clip and title information of the video into a pre-established prediction model to obtain a relevance between the inputted video frame and a title of the video; and
    determining an excitement of the video clip, based on the relevance between the video frame in the video clip and the title; and
    the method further comprising:
    determining a target video clip from the video clips, based on the excitement of each of the video clips,
    wherein inputting a feature sequence of a video frame in the video clip and title information of the video into a pre-established prediction model to obtain a relevance between the inputted video frame and a title of the video comprises:
    inputting a feature sequence into a first fully connected network module, and outputting a dimension-reduced feature sequence;
    inputting the dimension-reduced feature sequence into a forward GRU (gated recurrent unit) module and a reverse GRU module respectively, and splicing outputs of the forward GRU module and the reverse GRU module to obtain an encoded feature sequence; and
    inputting the encoded feature sequence and title information of the video into an attention module to obtain the relevance between the video frame and the title, the attention module comprising a second fully connected network module and a Softmax processing module, an output dimension of the second fully connected network module being 1.

2. The method according to claim 1, wherein,
    an output dimension of the first fully connected network module is smaller than a dimension of the feature sequence of the video frame, so that a dimension of the feature sequence outputted by the first fully connected network module is smaller than the dimension of the feature sequence of the video frame; and
    hidden dimensions of the forward GRU module and the reverse GRU module are both half of the output dimension of the first fully connected network module, so that a dimension of the encoded feature sequence formed after splicing the outputs of the forward GRU module and the reverse GRU module is the same as the dimension of the feature sequence outputted by the first fully connected network module.

3. The method according to claim 2, wherein the pre-established prediction model is obtained by training as follows:
    acquiring a training video;
    acquiring a feature sequence of a video frame in the training video, title information of the training video, and a relevance between the video frame in the training video and the title information of the training video, based on the acquired video; and
    using the acquired feature sequence of the video frame in the training video and the title information of the training video as inputs, and using the relevance between the video frame in the training video and the title information of the training video as an expected output, training a pre-established initial prediction model to obtain the prediction model after training.

4. The method according to claim 1, wherein the title information is acquired as follows:
    performing word segmentation on the title of the video;
    determining a position index of a word included in the title of the video in a dictionary, the dictionary being a set of pre-stored words; and
    determining the position index as the title information of the video.

5. The method according to claim 1, wherein the video frame is selected from the video clip based on a preset condition.

6. A server, comprising:
    one or more processors; and
    a storage apparatus, storing one or more programs thereon,
    the one or more programs, when executed by the one or more processors, cause the one or more processors to perform operations, the operations comprising:
    determining at least two video clips from a video;
    for each video clip, performing following excitement determination steps:
    inputting a feature sequence of a video frame in the video clip and title information of the video into a pre-established prediction model to obtain a relevance between the inputted video frame and a title of the video; and
    determining an excitement of the video clip, based on the relevance between the video frame in the video clip and the title; and
    the operations further comprising:
    determining a target video clip from the video clips, based on the excitement of each of the video clips,
    wherein inputting a feature sequence of a video frame in the video clip and title information of the video into a pre-established prediction model to obtain a relevance between the inputted video frame and a title of the video comprises:
    inputting a feature sequence into a first fully connected network module, and outputting a dimension-reduced feature sequence;
    inputting the dimension-reduced feature sequence into a forward GRU (gated recurrent unit) module and a reverse GRU module respectively, and splicing outputs of the forward GRU module and the reverse GRU module to obtain an encoded feature sequence; and inputting the encoded feature sequence and title information of the video into an attention module to obtain the relevance between the video frame and the title, the attention module comprising a second fully connected network module and a Softmax processing module, an output dimension of the second fully connected network module being 1.

7. The server according to claim 6, wherein, an output dimension of the first fully connected network module is smaller than a dimension of the feature sequence of the video frame, so that a dimension of the feature sequence outputted by the first fully connected network module is smaller than the dimension of the feature sequence of the video frame; and hidden dimensions of the forward GRU module and the reverse GRU module are both half of the output dimension of the first fully connected network module, so that a dimension of the encoded feature sequence formed after splicing the outputs of the forward GRU module and the reverse GRU module is the same as the dimension of the feature sequence outputted by the first fully connected network module.

8. The server according to claim 7, wherein the pre-established prediction model is obtained by training as follows:

acquiring a training video;

acquiring a feature sequence of a video frame in the training video, title information of the training video, and a relevance between the video frame in the training video and the title information of the training video, based on the acquired video; and using the acquired feature sequence of the video frame in the training video and the title information of the training video as inputs, and using the relevance between the video frame in the training video and the title information of the training video as an expected output, training a pre-established initial prediction model to obtain the prediction model after training.

9. The server according to claim 6, wherein the title information is acquired as follows:

performing word segmentation on the title of the video;

determining a position index of a word included in the title of the video in a dictionary, the dictionary being a set of pre-stored words; and determining the position index as the title information of the video.

10. The server according to claim 6, wherein the video frame is selected from the video clip based on a preset condition.

11. A non-transitory computer readable medium, storing a computer program thereon, the program, when executed by a processor, cause the processor to perform operations, the operations comprising:

determining at least two video clips from a video;

for each video clip, performing following excitement determination steps:

inputting a feature sequence of a video frame in the video clip and title information of the video into a pre-established prediction model to obtain a relevance between the inputted video frame and a title of the video; and determining an excitement of the video clip, based on the relevance between the video frame in the video clip and the title; and the operations further comprising:

determining a target video clip from the video clips, based on the excitement of each of the video clips, wherein inputting a feature sequence of a video frame in the video clip and title information of the video into a pre-established prediction model to obtain a relevance between the inputted video frame and a title of the video comprises:

inputting a feature sequence into a first fully connected network module, and outputting a dimension-reduced feature sequence;

inputting the dimension-reduced feature sequence into a forward GRU (gated recurrent unit) module and a reverse GRU module respectively, and splicing outputs of the forward GRU module and the reverse GRU module to obtain an encoded feature sequence; and inputting the encoded feature sequence and title information of the video into an attention module to obtain the relevance between the video frame and the title, the attention module comprising a second fully connected network module and a Softmax processing module, an output dimension of the second fully connected network module being 1.

12. The non-transitory computer readable medium according to claim 11, wherein, an output dimension of the first fully connected network module is smaller than a dimension of the feature sequence of the video frame, so that a dimension of the feature sequence outputted by the first fully connected network module is smaller than the dimension of the feature sequence of the video frame; and hidden dimensions of the forward GRU module and the reverse GRU module are both half of the output dimension of the first fully connected network module, so that a dimension of the encoded feature sequence formed after splicing the outputs of the forward GRU module and the reverse GRU module is the same as the dimension of the feature sequence outputted by the first fully connected network module.

13. The non-transitory computer readable medium according to claim 12, wherein the pre-established prediction model is obtained by training as follows:

acquiring a training video;

acquiring a feature sequence of a video frame in the training video, title information of the training video, and a relevance between the video frame in the training video and the title information of the training video, based on the acquired video; and using the acquired feature sequence of the video frame in the training video and the title information of the training video as inputs, and using the relevance between the video frame in the training video and the title information of the training video as an expected output, training a pre-established initial prediction model to obtain the prediction model after training.

14. The non-transitory computer readable medium according to claim 11, wherein the title information is acquired as follows:

performing word segmentation on the title of the video;

determining a position index of a word included in the title of the video in a dictionary, the dictionary being a set of pre-stored words; and determining the position index as the title information of the video.

15. The non-transitory computer readable medium according to claim 11, wherein the video frame is selected from the video clip based on a preset condition.

* * * * *